(12) United States Patent
Chen et al.

(10) Patent No.: US 11,962,860 B1
(45) Date of Patent: Apr. 16, 2024

(54) SYSTEMS AND METHODS FOR GENERATING AVATAR REACTIONS DURING A LIVE VIDEO BROADCAST

(71) Applicant: Meta Platforms Technologies, LLC, Menlo Park, CA (US)

(72) Inventors: David Ray Chen, San Diego, CA (US); King Hao Chen, San Lorenzo, CA (US); Gian Paolo Pile Cruz, San Mateo, CA (US); Michael Groseclose, Mission Viejo, CA (US); Aaron Sidney Kaufer, Mountain View, CA (US); Caio Mendonca Yassoyama, Sunnyvale, CA (US); Xiao Chen, Sunnyvale, CA (US); Naga Ramesh Kamisetti, Menlo Park, CA (US); Jonathan Zhang, Dublin, CA (US); Jay Quin, San Francisco, CA (US); Dong Li, Los Altos, CA (US); Zachary Rude, Walnut Creek, CA (US); Gregory Reiner, Brooklyn, NY (US); Anthony Samaha, New York City, NY (US); Hwa Young Jung, New York City, NY (US); Eman Ashour Zomrawy Mohammed, Bayonne, NJ (US); Michael Sheppard Horowitz, New York, NY (US); Abhishek Jain, Jersey City, NJ (US); Erik Weiss, Chicago, IL (US); Xianda Wei, Jersey City, NJ (US); James Matthew Ryburn, Brooklyn, NY (US); Mireille Gonthier, Chappaqua, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/060,716

(22) Filed: Dec. 1, 2022

(51) Int. Cl.
*H04N 21/478* (2011.01)
*H04N 7/00* (2011.01)
(Continued)

(52) U.S. Cl.
CPC .......... *H04N 21/478* (2013.01); *H04N 7/002* (2013.01); *H04N 21/2187* (2013.01); *H04N 21/488* (2013.01)

(58) Field of Classification Search
None
See application file for complete search history.

(56) References Cited

U.S. PATENT DOCUMENTS

| 2011/0296324 A1* | 12/2011 | Goossens | G06Q 50/01 |
| | | | 715/763 |
| 2013/0103766 A1* | 4/2013 | Gupta | G06Q 10/107 |
| | | | 709/206 |

(Continued)

*Primary Examiner* — James R Marandi
(74) *Attorney, Agent, or Firm* — Greenberg Traurig, LLP

(57) ABSTRACT

The disclosed computer-implemented method may include systems for generating personalized avatar reactions during live video broadcasts. For example, the systems and methods described herein can access a social networking system user's profile to identify an avatar associated with the social networking system user. The systems and methods can generate an avatar reaction by modifying one or more features of the avatar based on a corresponding emoticon reaction. Once generated, the social networking system user can select the avatar reaction for addition to an ephemeral reaction stream associated with a live video broadcast. Various other methods, systems, and computer-readable media are also disclosed.

20 Claims, 10 Drawing Sheets

(51) Int. Cl.
*H04N 21/2187* (2011.01)
*H04N 21/488* (2011.01)

(56) References Cited

U.S. PATENT DOCUMENTS

| | | | |
|---|---|---|---|
| 2014/0143682 A1* | 5/2014 | Druck | G06Q 30/0241 715/752 |
| 2019/0001223 A1* | 1/2019 | Blackstock | G06N 3/006 |
| 2019/0114037 A1* | 4/2019 | Geiger | H04L 65/00 |
| 2020/0034025 A1* | 1/2020 | Brady | G09B 19/00 |
| 2022/0191157 A1* | 6/2022 | Lee | H04L 51/063 |

\* cited by examiner

SYSTEMS AND METHODS FOR GENERATING AVATAR REACTIONS DURING A LIVE VIDEO BROADCAST

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
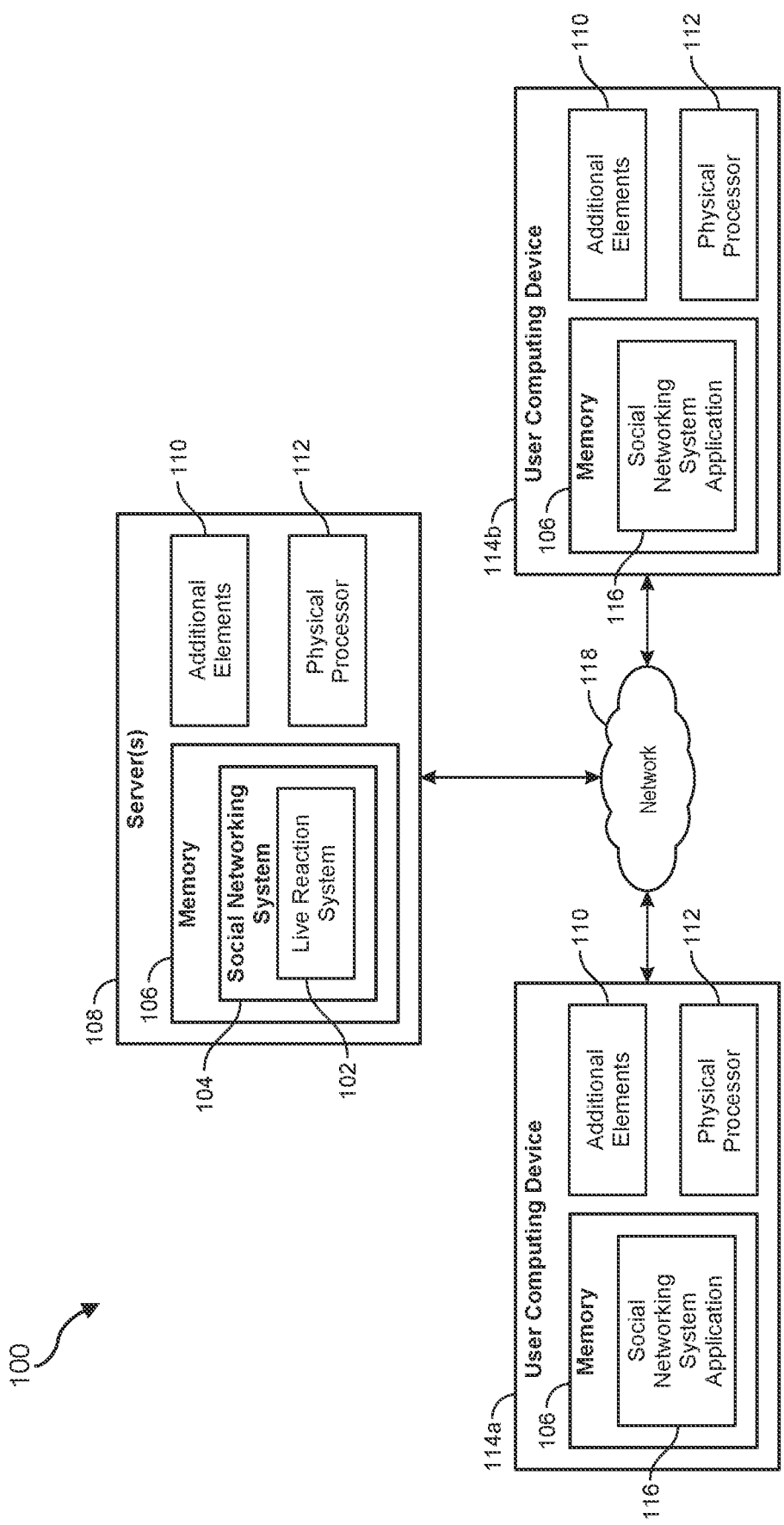
FIG. 1 is an overview diagram of an environment in which a live reaction system operates in accordance with one or more implementations.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION OF EXEMPLARY IMPLEMENTATIONS

Social networking systems provide many ways for user to engage with each other. For example, many social networking systems enable users to compose posts and send electronic messages to friends. Some social networking systems can further stream live user-broadcasts from one user computing device that can be watched by other social networking system co-users.

Despite this, example social networking systems often fail to provide users with personalized ways to engage with live user-broadcasts. For example, while some example social networking systems enable users to react to live broadcasts in real-time, these real-time reactions are generally limited to generic emoticons. If a user wants to engage with a live broadcast in a personalized way, example social networking systems typically limit that user to commenting on the live broadcast. Comments, however, take time to compose and may not immediately be seen by the broadcaster in the live video broadcast.

As such, the present disclosure describes implementations that utilize users' avatars to generate personalized reactions for reacting to live broadcasts in real-time. As will be described in greater detail below, these implementations include a live reaction system that can access a user's avatar to generate avatar reactions for use during a live video broadcast. In response to a detected selection of the generated avatar reaction, the live reaction system can add the avatar reaction to an ephemeral reaction stream associated with the live video broadcast. In this way, the user can react to the live video broadcast in a way that is highly personalized, instantaneous, and likely to be seen by the live video broadcaster in real-time.

Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
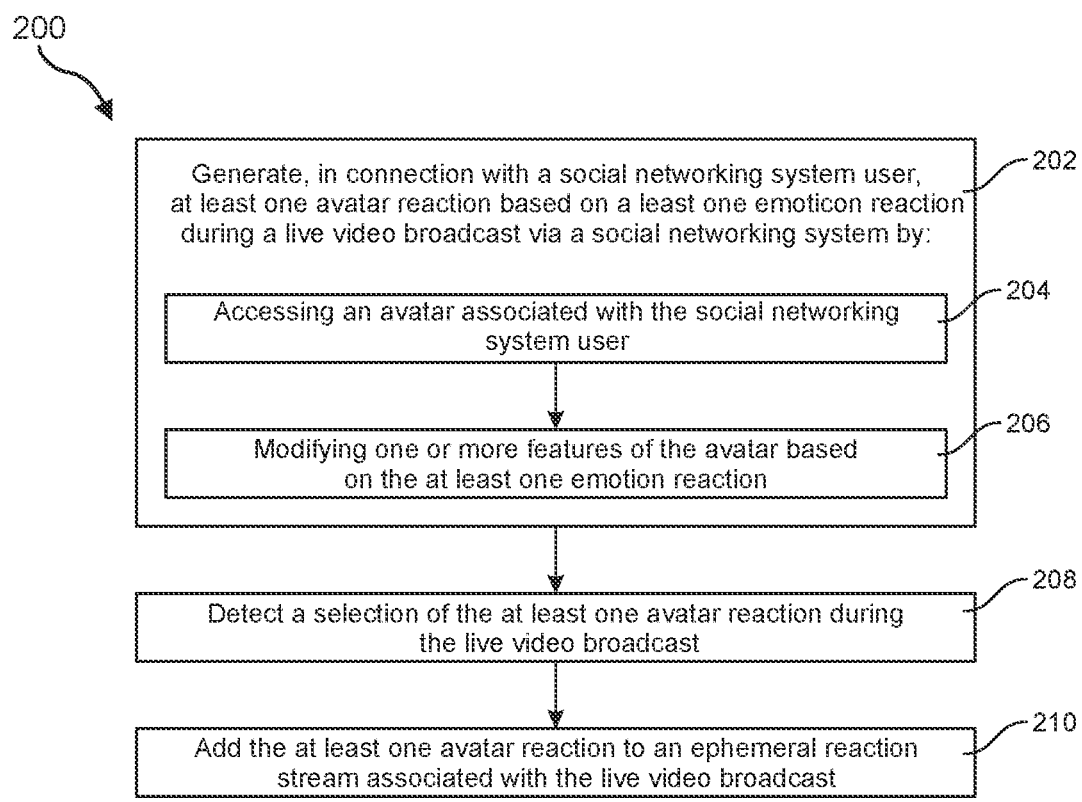
FIG. 2 is a flow diagram of an exemplary computer-implemented method for generating avatar reactions during a live video broadcast in accordance with one or more implementations.
Figure 3A:
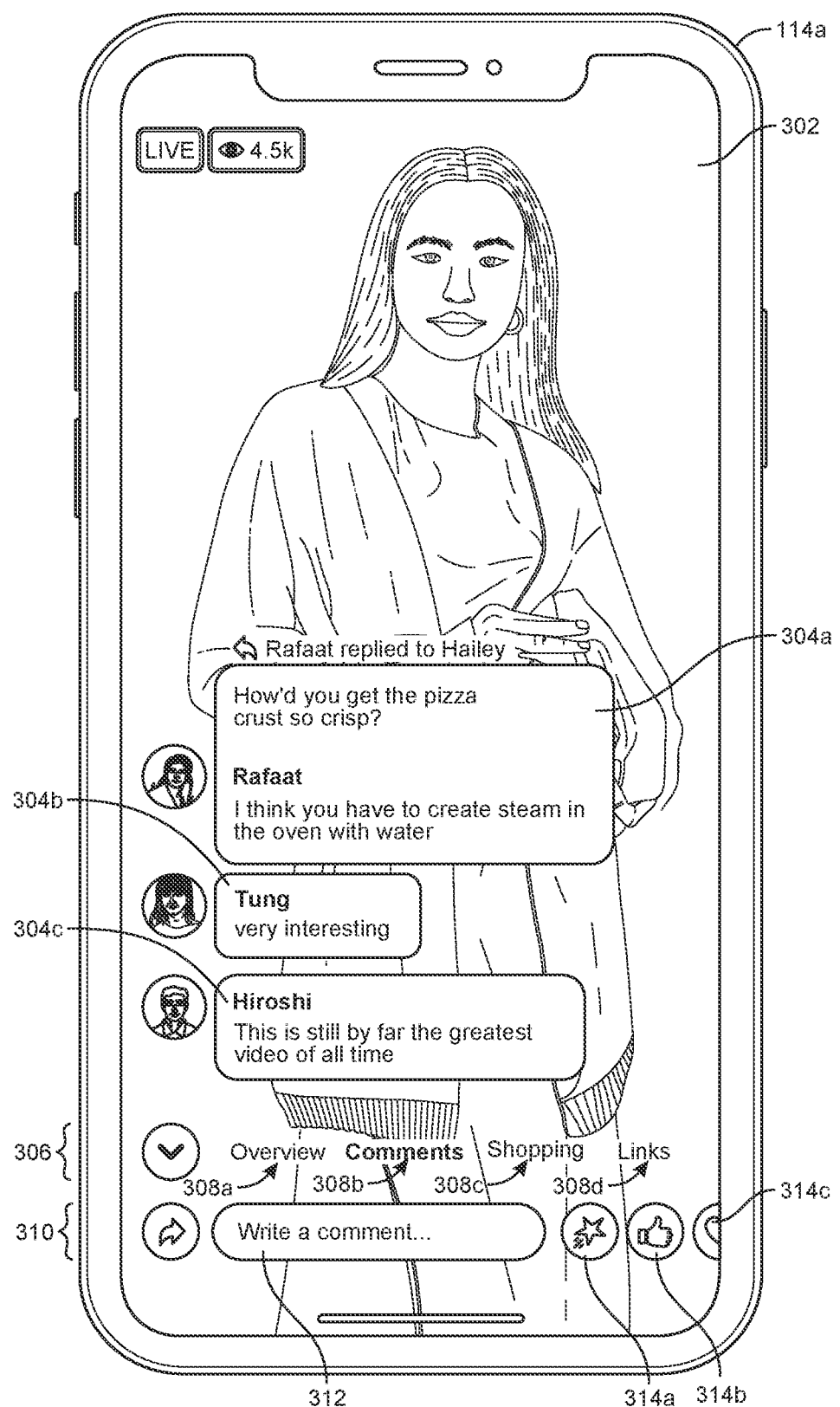
FIGS. 3A-3G illustrate example user interfaces and displays generated by the live reaction system in accordance with one or more implementations.
Figure 3B:
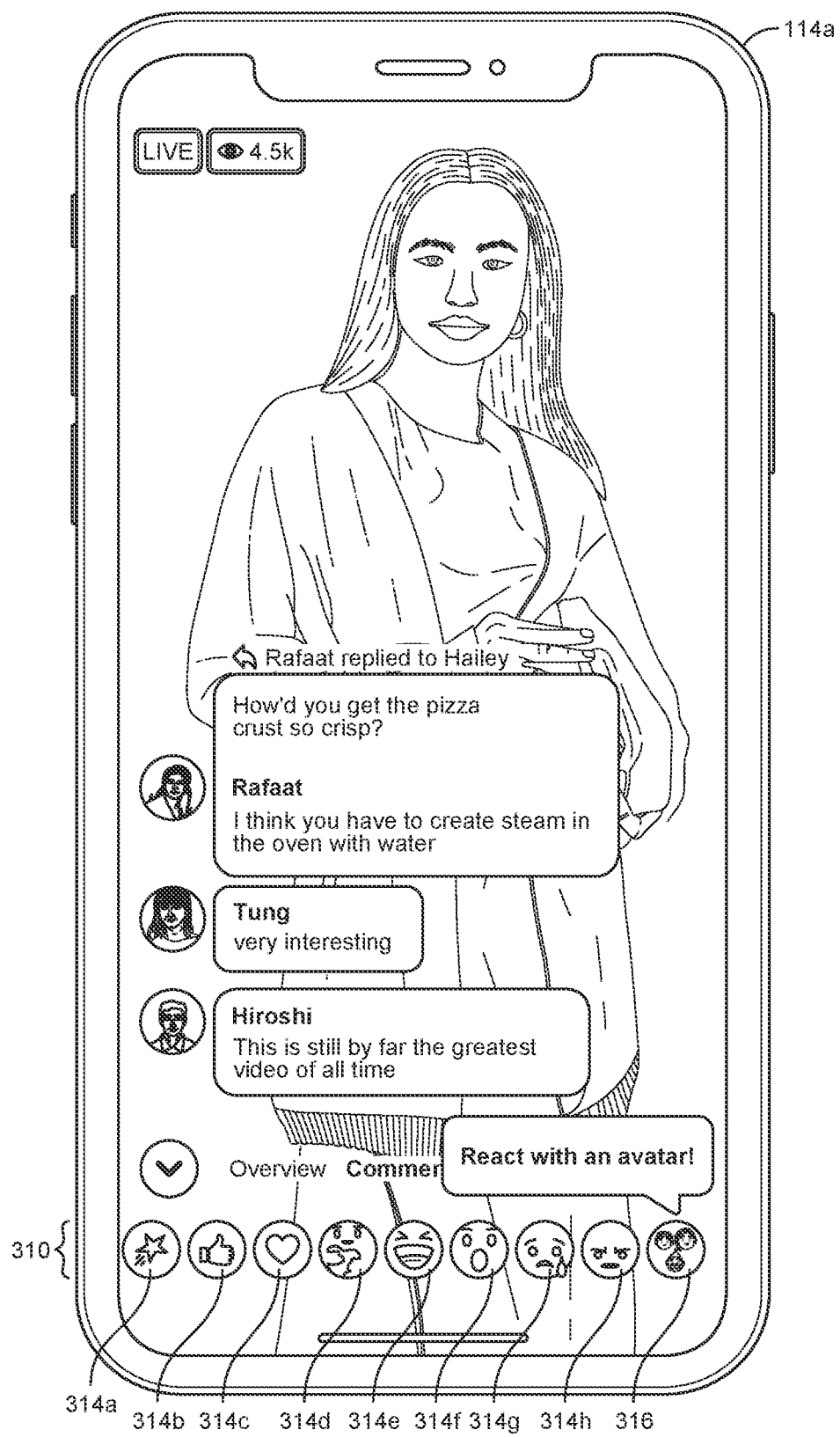
Figure 3C:
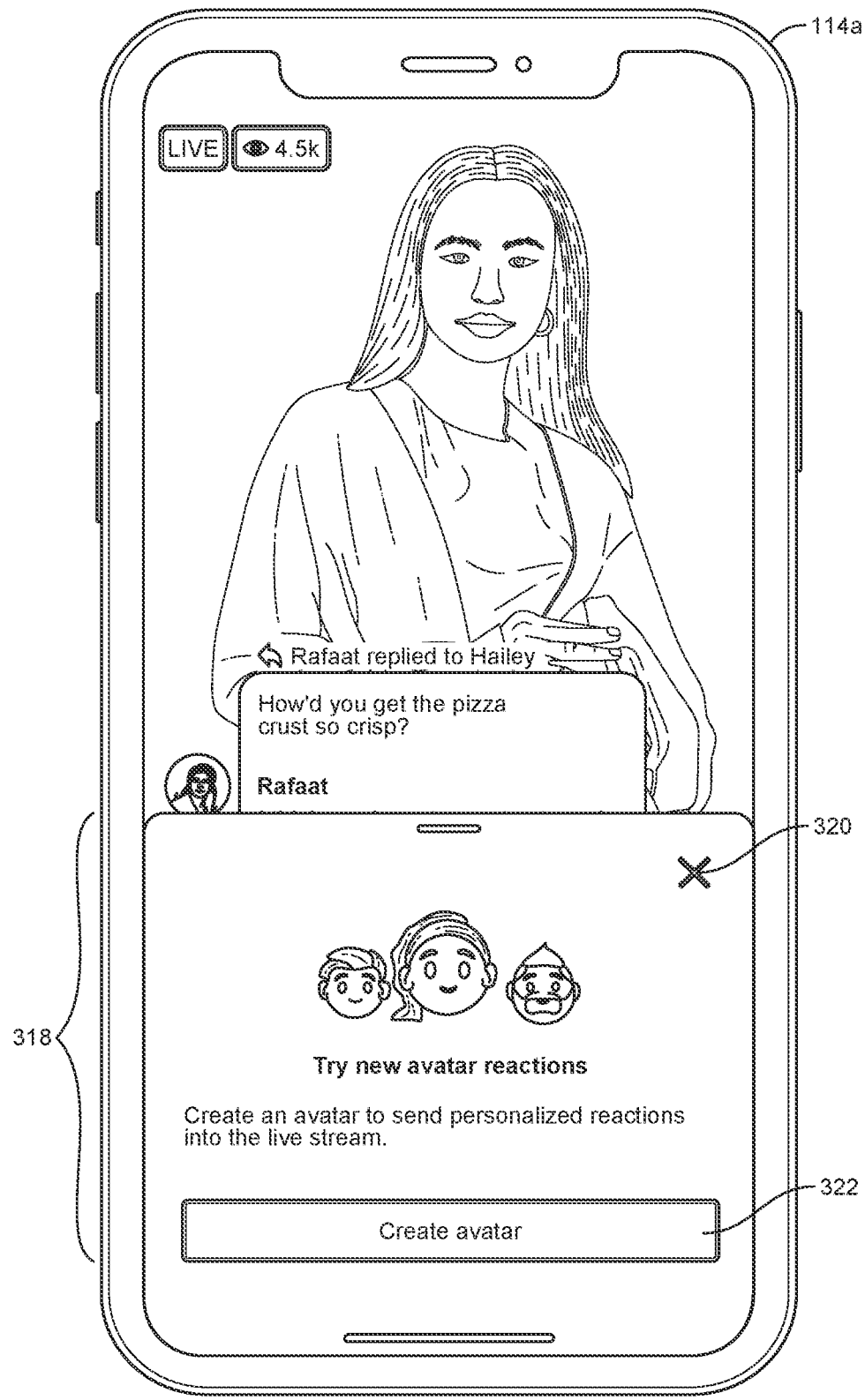
Figure 3D:
Figure 3E:
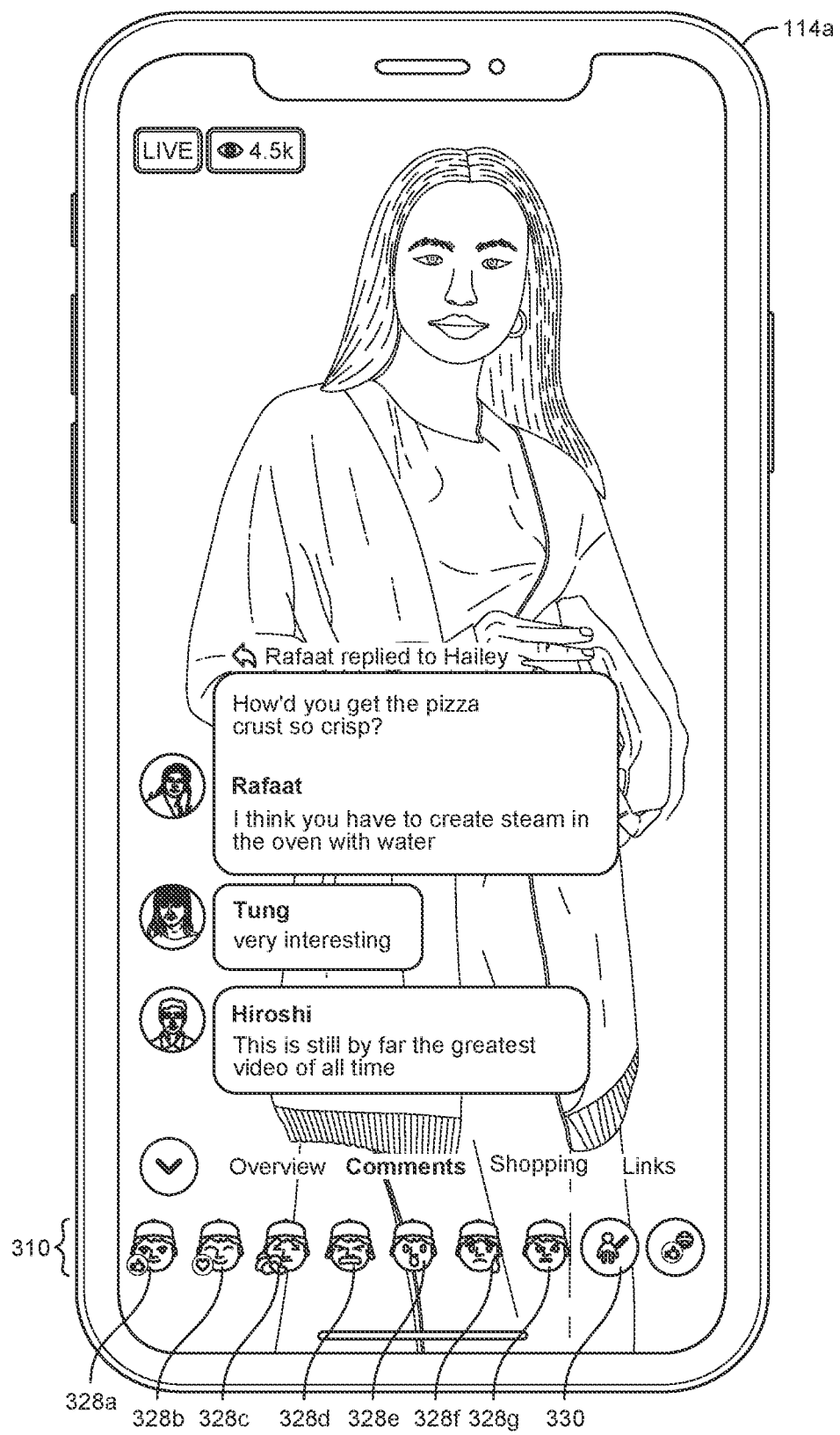
Figure 3F:
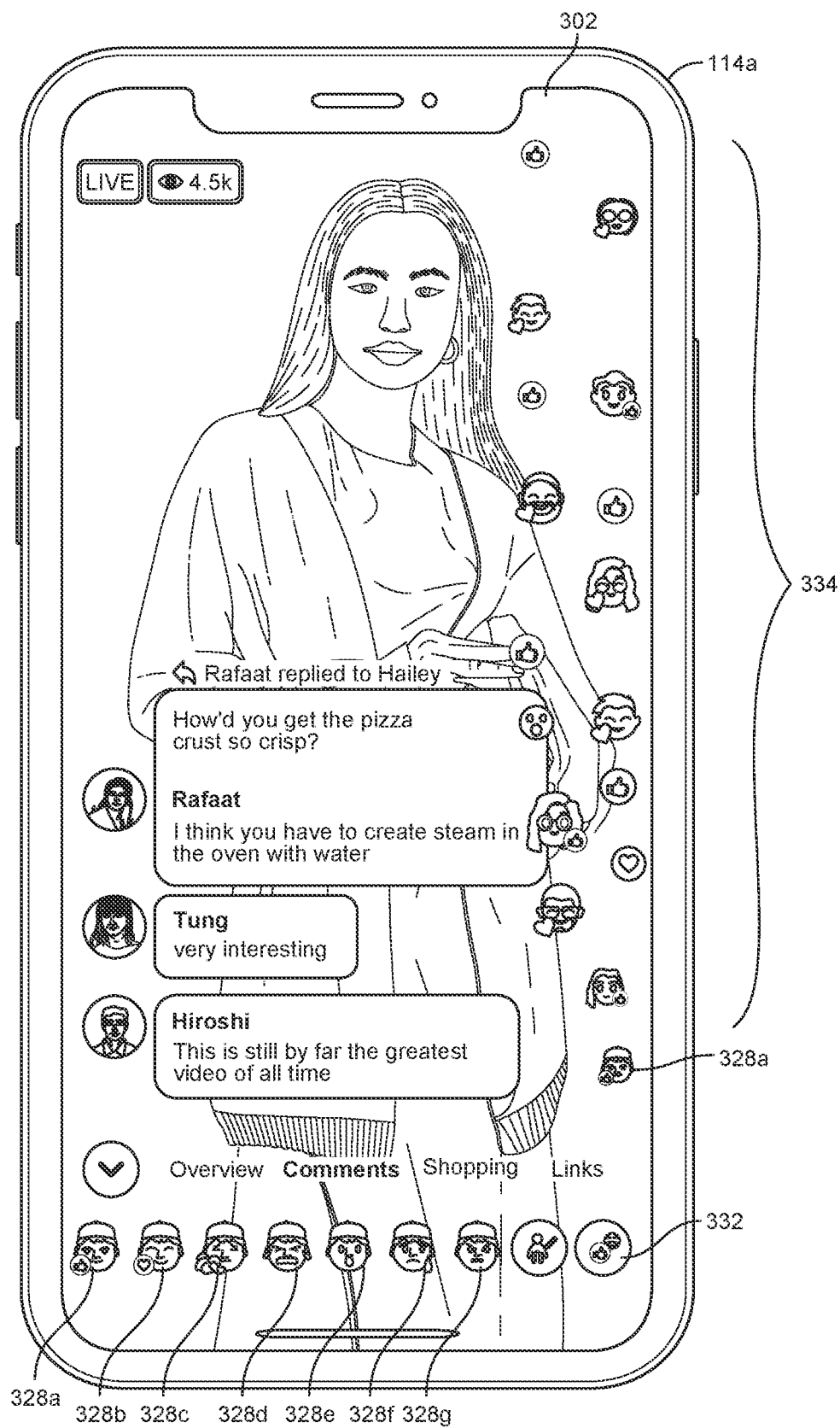
Figure 3G:
Figure 4:
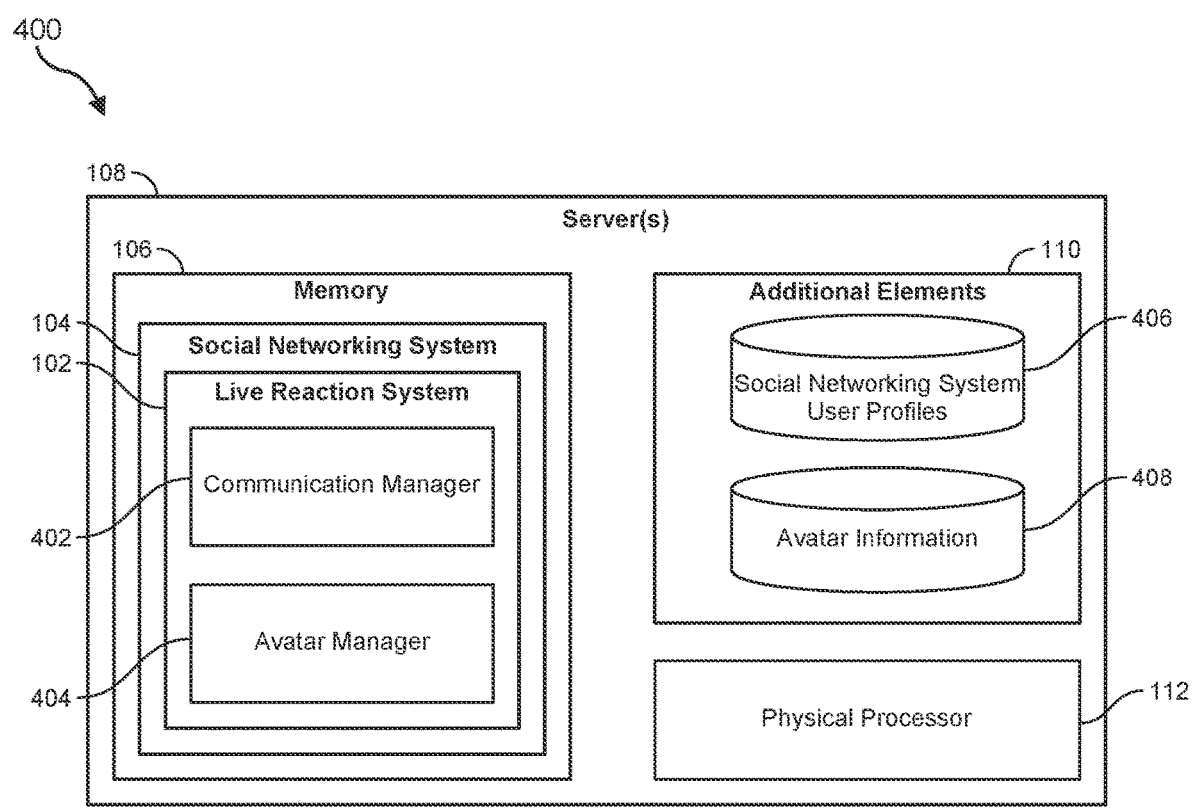
FIG. 4 is a detailed diagram of the live reaction system in accordance with one or more implementations.

The following will provide, with reference to FIGS. 1-4, detailed descriptions of a live reaction system that generates avatar reactions for use during live video broadcasts. For example, FIG. 1 shows a networked environment where the live reaction system interacts with user computing devices to generate and provide avatar reactions. FIG. 2 shows a flow diagram of steps taken by the live reaction system while generating an avatar reaction. FIGS. 3A-3G illustrate graphical user interfaces generated by the live reaction system during a live video broadcast that include selectable options corresponding to avatar reactions. Finally, FIG. 4 shows a detailed diagram illustrating additional features and functionality of the live reaction system.

As just mentioned, FIG. 1 illustrates an exemplary networking environment 100 implementing aspects of the present disclosure. For example, the networking environment 100 can include server(s) 108, user computing devices 114a, 114b, and a network 118. As further shown, the server(s) 108 and the user computing devices 114a, 114b can each include a memory 106, additional elements 110, and a physical processor 112.

In at least one implementation, a live reaction system 102 is implemented as part of a social networking system 104, within the memory 106 of the server(s) 108. In some implementations, each of the user computing devices 114a, 114b may also include a social networking system application 116 installed on the memories 106 thereon. As shown in FIG. 1, the user computing devices 114a, 114b and the server(s) 108 can communicate via the network 118 to receive live broadcast data and to send avatar reactions.

As illustrated in FIG. 1, the user computing devices 114a, 114b can include any type of user device suitable for live social networking system activity including, but not limited to, smart phones, smart wearables, laptop computers, desktop computers, tablet computers, video conferencing devices, and virtual reality devices. In one or more implementations, the user computing devices 114a, 114b also include a camera. The camera can capture and/or stream digital photographs and/or digital videos.

As mentioned above, the live reaction system 102 can operate as part of the social networking system 104. In one or more implementations, the social networking system 104 can broadcast live video from one user computing device (e.g., the user computing device 114b) to other user computing devices (e.g., the user computing device 114a). For example, the social networking system 104 can broadcast the live video such that viewers can watch the broadcast and engage in other social networking system activity relative to the live video broadcast. For instance, the social networking system 104 can allow for viewers to comment on the live video broadcast, notify other users regarding the live video broadcast, and react to the live video broadcast in real-time by way of an ephemeral reaction stream.

In one or more implementations, the users of the user computing devices 114a, 114b are also users of the social networking system 104. In some implementations, the users of the user computing devices 114a, 114b may be "friends"

within the social networking system 104. In some implementations, the user of the user computing device 114a may be a "follower" of the user of the user computing device 114b within the social networking system 104.

Moreover, as shown in FIG. 1, the user computing devices 114a, 114b can include the social networking system application 116. In one or more implementations, the social networking system application 116 transmits and receives data to and from the social networking system 104. In at least one implementation, the social networking system application 116 can transmit and receive live video broadcast data. Additionally, in some implementations, the social networking system application 116 can transmit detected user interaction information.

As mentioned above, the user computing devices 114a, 114b and the server(s) 108 may be communicatively coupled through the network 118. The network 118 may represent any type or form of communication network, such as the Internet, and may include one or more physical connections, such as a LAN, and/or wireless connections, such as a WAN.

Although FIG. 1 illustrates components of the network environment 100 in one arrangement, other arrangements are possible. For example, in one implementation, the live reaction system 102 and the social networking system 104 may exist across multiple networked servers. In another implementation, the live reaction system 102 may operate as a web browser plugin and/or an extension to the social networking system application 116. In additional implementations, the networking environment 100 may include any number of user computing devices and/or servers. For example, in one or more implementations, any number of user computing devices may display a live video broadcast from a single user computing device.

In one or more implementations, the methods and steps performed by the live reaction system 102 reference multiple terms. As used herein, an "avatar" can refer to a configurable digital representation of a social networking system user. For example, a user may configure their avatar (e.g., via the social networking system application 116) to include any of various skin tones, hair colors, hair styles, eye colors, body shapes, clothing styles, etc. In at least one implementation, an avatar has various alterable features such as, but not limited to, limb placement features, postural features, and facial features. To illustrate, facial features can include a mouth, a nose, eyes, eyebrows, teeth, etc.

As used herein, an "emoticon reaction" can refer to a generic emoticon that can be added to an ephemeral reaction stream. For example, emoticon reactions can convey various emotions. To that end, emoticon reactions can include, but are not limited to, a like reaction, a love reaction, a hug reaction, a laugh reaction, a surprise reaction, a sad reaction, or an angry reaction.

As used herein, an "avatar reaction" can refer to a personalized reaction that can be added to an ephemeral reaction stream. For example, an avatar reaction associated with a particular social networking system user can include that user's avatar with a particular facial pose that conveys a particular emotion. In some implementations, an avatar reaction can include additional items in addition to the facial pose. Such additional items can include, but are not limited to, tear drops, a heart, a thumbs-up, and so forth.

As used herein, a "live video broadcast" can refer to streamed digital media that is broadcast in real-time over the internet. For example, a live video broadcast may be hosted by the social networking system 104 which broadcasts the stream to other social networking system users. A live video broadcast can include live digital video, live audio, recorded digital video and/or audio, digital photographs, and other digital media.

As used herein, the term "ephemeral reaction stream" can refer to a flow or feed of viewer reactions to a live video broadcast. In one or more implementations, the social networking system 104 overlays an ephemeral reaction stream on a display of the live video broadcast so that the broadcaster and viewers can see how viewers are reacting to the live video broadcast. In at least one implementation, the social networking system 104 animates the ephemeral reaction stream such that each newly added reaction is visible while moving up or across the live video broadcast display, but is no longer visible when it moves off of the display.

As mentioned above, FIG. 2 is a flow diagram of an exemplary computer-implemented method 200 for generating avatar reactions during a live video broadcast. The steps shown in FIG. 2 may be performed by any suitable computer-executable code and/or computing system, including the system(s) illustrated in FIG. 4. In one example, each of the steps shown in FIG. 2 may represent an algorithm whose structure includes and/or is represented by multiple sub-steps, examples of which will be provided in greater detail below.

As illustrated in FIG. 2, at step 202 the live reaction system 102 may generate, in connection with a social networking system user, at least one avatar reaction based on at least one emoticon reaction during a live video broadcast via a social networking system. For example, the live reaction system 102 may generate the at least one avatar reaction at step 204 by accessing an avatar associated with the social networking system user and, at step 206, modifying the avatar based on the at least one emoticon reaction.

To illustrate, the live reaction system 102 can access the social networking system user's social networking system profile to identify an avatar previously configured by the social networking system user. In one or more implementations, the live reaction system 102 can modify the face of the identified avatar to include a pose depicted by the at least one emoticon reaction. For example, the live reaction system 102 can reposition and/or re-draw the avatar's mouth and eyes to mimic the mouth and eyes depicted by the at least one emoticon reaction. Additionally, the live reaction system 102 can add items (e.g., hearts) to the avatar reaction depending on items included in the at least one emoticon reaction.

Moreover, at step 208 the live reaction system 102 can detect a selection of the at least one avatar reaction during the live video broadcast. For example, in response to generating the at least one avatar reaction, the live reaction system 102 can add the at least one avatar reaction to a listing of reactions that is included in a display of the live video broadcast. In at least one implementation, the live reaction system 102 can detect a user selection of the at least one avatar reaction from the listing during the live video broadcast.

Finally, at step 210 the live reaction system 102 can add the at least one avatar reaction to an ephemeral reaction stream associated with the live video broadcast. For example, the live reaction system 102 can add the avatar reaction in real-time to the ephemeral reaction stream including reactions (e.g., emoticon reactions and/or avatar reactions) from other social networking system users who are currently watching the live video broadcast. In at least one implementation, the at least one avatar reaction is displayed in the ephemeral reaction stream for a predetermined amount of time until the at least one avatar reaction is no longer viewable due to having moved off of the display.

As discussed above, the live reaction system 102 generates avatar reactions during a live video broadcast to enable users to have personalized reactions to the broadcast in real-time. FIGS. 3A-3G illustrate a series of user interfaces showing the live reaction system 102 generating and providing avatar reactions during a live video broadcast. For example, as shown in FIG. 3A, the social networking system 104 can generate and provide a live video broadcast interface 302 on a display (e.g., a touch screen display) of the user computing device 114a. In one or more implementations, the social networking system 104 generates the live video broadcast interface 302 to display the live video stream of the broadcast as well as other social networking system activity associated with the live video broadcast.

To illustrate, the social networking system 104 can generate the live video broadcast interface 302 including an option listing 306 of broadcast options 308a, 308b, 308c, and 308d. In response to a detected selection of any of the broadcast options 308a-308d, the social networking system 104 can provide different functionality in connection with the live broadcast video. For example, in response to a detected selection of the broadcast option 308b, the social networking system 104 can display comments 304a, 304b, and 304c and other reactions associated with the live video broadcast.

Additionally, in response to a detected selection of the broadcast option 308b, the social networking system 104 can generate the live video broadcast interface 302 including a reaction listing 310 including a comment text box 312 and emoticon reactions 314a, 314b, and 314c, as well as the emoticon reactions 314d, 314e, 314f, 314g, and 314h as shown in FIG. 3B. In response to detected selections of any of the emoticon reactions 314a-314h, the live reaction system 102 can add the associated emoticon reaction to an ephemeral reaction stream associated with the live video broadcast.

Moreover, as shown in FIG. 3B, the live reaction system 102 can include an avatar reaction option 316 to the reaction listing 310. In one or more implementations, the live reaction system 102 can provide additional information about using an avatar as a reaction. For example, as shown in FIG. 3C, the live reaction system 102 can generate and provide the overlay 318 including information about avatar reactions. In at least one implementation, the live reaction system 102 generates and provides the overlay 318 in response to determining that there is no avatar associated with the social networking system profile of the user of the user computing device 114a. The live reaction system 102 can cancel the avatar creation process in response a detected selection of an exit option 320.

Alternatively, in response to a detected selection of a create avatar option 322, the live reaction system 102 can hand-off the avatar creation process to the social networking system 104. For example, as shown in FIG. 3D, the social networking system 104 can generate and provide an avatar creation interface 324. In at least one implementation, the social networking system 104 generates the avatar creation interface 324 with an introduction to avatars, as well as some examples of what avatars can look like. The social networking system 104 can continue with the avatar creation process in response to a detected selection of a next option 326.

At this point, the social networking system 104 can generate additional interfaces wherein the user of the user computing device 114a can configure an avatar. The social networking system 104 can further associate the user's avatar with the user's social networking system profile. Alternatively, the social networking system 104 can cancel the avatar creation process and return to the live video broadcast interface 302 in response to a detected selection of the exit option 320.

Once the user of the user computing device 114a has configured an avatar via the social networking system 104, the live reaction system 102 can generate one or more avatar reactions. For example, as shown in FIG. 3E, the live reaction system 102 can generate the avatar reactions 328a, 328b, 328c, 328d, 328e, 328e, 328f, and 328g utilizing the avatar of the user of the user computing device 114a. As will be discussed in greater detail with regard to FIG. 4, the live reaction system 102 can generate the avatar reactions 328a-328g by modifying features of the user's avatar based on the corresponding emoticon reaction. For instance, the live reaction system 102 can determine a pose of an emoticon reaction and then modify features of the user's avatar to mimic that pose to create a corresponding avatar reaction. To illustrate, the live reaction system 102 can determine that an emoticon reaction includes a smiling facial pose, the live reaction system 102 can further modify the mouth of the user's avatar to depict a smile. In at least one implementation, the live reaction system 102 generates each of the avatar reactions 328a-328g including the avatar's head in various poses. In additional implementations, the live reaction system 102 can generate avatar reactions including other parts of the user's avatar, or the avatar's entire body.

As further shown in FIG. 3E, the live reaction system 102 can further include an editing option 330 in the reaction listing 310. In one or more implementations, the live reaction system 102 can provide one or more editing controls in response to a detected selection of the editing option 330. For example, the live reaction system 102 can provide editing controls that enable the user of the user computing device 114a to edit features of one or more of the avatar reactions 328a-328g such as, but not limited to, colors, expressions, foreground items, and so forth. In at least one implementation, the live reaction system 102 can provide the ability for an avatar reaction to be edited to mirror a user's facial gestures in real-time by capturing an image of the user (e.g., via a front-facing camera of the user computing device 114a), and modifying the user's avatar to depict the same facial gestures.

In one or more implementations, the live reaction system 102 can detect a user selection of any of the avatar reactions 328a-328g. For example, as shown in FIG. 3F, the live reaction system 102 can detect a selection of the avatar reaction 328a. In response to the detected selection of the avatar reaction 328a, the live reaction system 102 can add the avatar reaction 328a to an ephemeral reaction stream 334 associated with the live video broadcast. In at least one implementation, the live reaction system 102 adds the avatar reaction 328a to the ephemeral reaction stream 334 such that the avatar reaction 328a moves up the live video broadcast interface 302 along with other reactions (e.g., both emoticon reactions and avatar reactions).

In at least one implementation, the live reaction system 102 can toggle the reaction listing 310 back-and-forth between the emoticon reactions 314a-314h and the avatar reactions 328a-328g in response to a detected selection of an emoticon reaction option 332. For example, as shown in FIG. 3G, the live reaction system 102 can replace the avatar reactions 328a-328g with the emoticon reactions 314a-314h in the reaction listing 310 in response to a detected selection of an emoticon reaction option 332. Similarly, the live reaction system 102 can replace the emoticon reactions 314a-314h with the avatar reactions 328a-328g in the reaction listing 310 in response to a detected selection of the avatar reaction option 316, as shown in FIG. 3G.

As mentioned above, the live reaction system 102 performs various functions in connection with generating avatar reactions during live video broadcasts. FIG. 4 is a block diagram 400 of the live reaction system 102 operating within the social networking system 104 on the server(s) 108 while performing these functions. As such, FIG. 4 provides additional detail with regard to these functions. For example, as shown in FIG. 4, the live reaction system 102 can include a communication manager 402 and an avatar manager 404. Moreover, the additional elements 110 can include social networking system user profiles 406 and avatar information 408.

In certain implementations, the live reaction system 102 may represent one or more software applications or programs that, when executed by a computing device, may cause the computing device to perform one or more tasks. For example, and as will be described in greater detail below, one or more of the communication manager 402 and the avatar manager 404 of the live reaction system 102 may represent software stored and configured to run on one or more computing devices, such as the server(s) 108. One or more of the communication manager 402 or the avatar manager 404 of the live reaction system 102 shown in FIG. 4 may also represent all or portions of one or more special purpose computers to perform one or more tasks.

As mentioned above, and as shown in FIG. 4, the live reaction system 102 can include the communication manager 402. In one or more implementations, the communication manager 402 handles transmission of data between the live reaction system 102 and the user computing devices 114a, 114b. For example, the communication manager 402 can receive indications of detected selections on the user computing devices 114a, 114b via the social networking system application 116. Additionally, the communication manager 402 can provide updated interface data from the live reaction system 102 to the user computing devices 114a, 114b including avatar reactions for display on the user computing devices 114a, 114b. In response to a detected selection of an avatar reaction, the communication manager 402 can add the avatar reaction to an ephemeral reaction stream associated with a digital video broadcast.

As further mentioned above, and as shown in FIG. 4, the live reaction system 102 can include the avatar manager 404. In one or more implementations, the avatar manager 404 handles all tasks in generating and providing avatar reactions in connection with the user computing devices 114a, 114b. For example, in one implementation, the avatar manager 404 updates the reaction listing 310 within the live video broadcast interface 302 to include the avatar reaction option 316.

In response to a detected selection of the avatar reaction option 316, the avatar manager 404 can access a social networking system profile within the social networking system user profiles 406 that is associated with the social networking system user associated with the user computing device where the selection was detected. Upon accessing the user's social networking system profile, the avatar manager 404 can first determine if there is an avatar within the avatar information 408 that is associated with that profile. If there is no associated avatar indicated by the avatar information 408, the avatar manager 404 can provide avatar creation options in connection with the social networking system 104 (e.g., as described above with reference to FIGS. 3C and 3D).

Once the avatar manager 404 identifies an avatar associated with the user's social networking system profile (e.g., either previously existing or newly created), the avatar manager 404 can generate avatar reactions during a live video broadcast using the identified avatar. For example, the avatar manager 404 can determine one or more emoticon reactions currently available to the social networking system user within the live video broadcast. For each of the one or more emoticon reactions, the avatar manager 404 can generate a corresponding avatar reaction.

In one or more implementations, the avatar manager 404 can generate an avatar reaction by modifying one or more features of the user's avatar based on an emoticon reaction. For example, the avatar manager 404 can analyze the emoticon reaction to determine a facial pose depicted by the emoticon reaction and altering facial features of the avatar's face to mirror the facial pose. To illustrate, the avatar manager 404 can analyze a crying emoticon reaction to determine that the facial pose depicted by the emoticon reaction includes a mouth that is frowning, eyes that are closed, and tear drops beneath the eyes. The avatar manager 404 can then extract or generate a copy of the avatar's face and alter the avatar's mouth to frown and the avatar's eyes to close. The avatar manager 404 can further add tear drops beneath the eyes.

In one or more implementations, the avatar manager 404 can determine the facial pose depicted by the emoticon reaction utilizing various tools including, but not limited to, machine learning, decision trees, if/then statements, databases, algorithms, and so forth. In at least one implementation, the avatar manager 404 can determine facial poses for emotion reactions including, but not limited to, a like reaction (e.g., such as with the emoticon reaction 314b shown in FIG. 3B), a love reaction (e.g., such as with the emoticon reaction 314c shown in FIG. 3B), a hug reaction (e.g., such as with the emoticon reaction 314d shown in FIG. 3B), a laugh reaction (e.g., such as with the emoticon reaction 314e shown in FIG. 3B), a surprise reaction (e.g., such as with the emoticon reaction 314f shown in FIG. 3B), a sad reaction (e.g., such as with the emoticon reaction 314g shown in FIG. 3B), and an angry reaction (e.g., such as with the emoticon reaction 314h shown in FIG. 3B).

In some implementations, the avatar manager 404 can further generate the avatar reaction by adding or overlaying additional items on the avatar reaction based on the corresponding emoticon reaction. For example, based on the corresponding emoticon reaction, the avatar manager 404 can overlay items including, but not limited to, hands, hearts, tears, and thumbs ups. Moreover, the avatar manager 404 can modify one or more characteristics of the avatar's face in the avatar reaction. For example, the avatar manager 404 can change the avatar's skin color from the original skin color to red in order to indicate anger.

In at least one implementation, the avatar manager 404 can further generate an avatar reaction based on real-time feedback from the associated social networking system user. For example, the avatar manager 404 can provide editing tools in connection with an avatar reaction that enable the user to modify the avatar reaction's facial pose, overlayed items, and other avatar reaction characteristics.

Moreover, in at least one implementation, the avatar manager 404 can further generate an avatar reaction based on the user's face in real-time. To illustrate, the avatar manager 404 can receive a digital video stream or digital image captured with a front-facing camera of the user computing device of the social networking system user. The digital video or image can show a facial gesture or pose that the user is currently making. The avatar manager 404 can analyze the digital video or image to extract the user's face, determine the facial gesture or pose depicted by the face, and modify one or more features of the user's avatar based on the facial gesture or pose to create a custom avatar reaction.

As shown in FIGS. 1 and 4, the server(s) 108 and the user computing devices 114a and 114b can include one or more physical processors, such as the physical processor 112. The physical processor 112 generally represents any type or form of hardware-implemented processing unit capable of interpreting and/or executing computer-readable instructions. In one implementation, the physical processor 112 may access and/or modify one or more of the components of the live reaction system 102. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, the server(s) 108 and the user computing devices 114a, 114b can include the memory 106. In one or more implementations, the memory 106 generally represents any type or form of volatile or non-volatile storage device or medium capable of storing data and/or computer-readable instructions. In one example, the memory 106 may store, load, and/or maintain one or more of the components of the live reaction system 102. Examples of the memory 106 can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIG. 4, the server(s) 108 and the user computing devices 114a, 114b can include additional elements 110. On the server(s) 108, the additional elements 110 can include the social networking system user profiles 406 and the avatar information 408. In one or more implementations, the social networking system user profiles 406 can include user information, demographic information, social networking system activity histories, and associated co-users (e.g., friends) and groups. In at least one implementation, the social networking system user profiles 406 can also include an indication of whether or not there is an avatar associated with each of the user profiles. In one or more implementations, the avatar information 408 can include avatar appearance data information and avatar use information. In at least one implementation, the live reaction system 102 stores the avatar information 408 such that there is a connection or pointer connecting each avatar to an associated social networking system user profile.

In summary, the live reaction system 102 enables social networking system users to react in real-time using personalized avatar reactions. As discussed above, the live reaction system 102 generates the avatar reactions to mirror corresponding emoticon reactions, and provides the avatar reactions within live video broadcast interface such that the user can quickly and easily select an avatar reaction during the live video broadcast. As such, the live reaction system 102 assists social networking system users in engaging with each other in a way that is intuitive and highly personalized.

Example Implementations

Example 1: A computer-implemented method for generating avatar reactions during a real-time communication session. For example, the method may include generating, in connection with a social networking system user, at least one avatar reaction based on at least one emoticon reaction during a live video broadcast via a social networking system by accessing an avatar associated with the social networking system user, and modifying one or more features of the avatar based on the at least one emoticon reaction. The method can further include detecting a selection of the at least one avatar reaction during the live video broadcast and adding the at least one avatar reaction to an ephemeral reaction stream associated with the live video broadcast.

Example 2: The computer-implemented method of Example 1, wherein accessing the avatar associated with the social networking system user can include identifying a social networking system profile associated with the social networking system user, identifying the avatar associated with the social networking system profile, and extracting a face of the avatar.

Example 3: The computer-implemented method of any of Examples 1 and 2, wherein modifying one or more features of the avatar based on the at least one emoticon reaction can include determining a facial pose depicted by the at least one emoticon reaction and altering facial features of the face of the avatar to mirror the facial pose.

Example 4: The computer-implemented method of any of Examples 1-3, wherein the at least one emoticon reaction can include at least one of: a like reaction, a love reaction, a hug reaction, a laugh reaction, a surprise reaction, a sad reaction, or an angry reaction.

Example 5: The computer-implemented method of any of Examples 1-4, wherein modifying one or more features the avatar based on the at least one emoticon reaction can further include capturing an image of the social networking system user making a facial gesture mirroring the at least one emoticon reaction and modifying the one or more features of the avatar based on the captured image.

Example 6: The computer-implemented method of any of Examples 1-5, wherein generating the at least one avatar reaction is in response to a detected selection of an avatar reaction option associated with the live video broadcast.

Example 7: The computer-implemented method of any of Examples 1-6, further including converting the at least one avatar reaction back to a corresponding at least one emoticon reaction in response to a detected selection of an emoticon reaction option associated with the live video broadcast.

In some examples, a system may include at least one processor and a physical memory including computer-executable instructions that, when executed by the at least one processor, cause the at least one processor to perform various acts. For example, the computer-executable instructions may cause the at least one processor to perform acts including generating, in connection with a social networking system user, at least one avatar reaction based on at least one emoticon reaction during a live video broadcast via a social networking system by accessing an avatar associated with the social networking system user, and modifying one or more features of the avatar based on the at least one emoticon reaction. The computer-executable instructions may further cause the at least one processor to perform acts including detecting a selection of the at least one avatar reaction during the live video broadcast and adding the at least one avatar reaction to an ephemeral reaction stream associated with the live video broadcast.

Additionally in some examples, a non-transitory computer-readable medium can include one or more computer-executable instructions that, when executed by at least one processor of a computing device, cause the computing device to perform various acts. For example, the one or more computer-executable instructions may cause the computing device to generate, in connection with a social networking system user, at least one avatar reaction based on at least one emoticon reaction during a live video broadcast via a social networking system by accessing an avatar associated with the social networking system user, and modifying one or more features of the avatar based on the at least one emoticon reaction. The one or more computer-executable instructions, when executed by the at least one processor of the computing device, can further cause the computing device to detect a selection of the at least one avatar reaction during the live video broadcast and add the at least one avatar reaction to an ephemeral reaction stream associated with the live video broadcast As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain implementations one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
generating, in connection with a social networking system user, at least one avatar reaction based on at least one emoticon reaction during a live video broadcast via a social networking system by:
accessing an avatar associated with the social networking system user, and
modifying one or more features of the avatar based on the at least one emoticon reaction;
detecting a selection of the at least one avatar reaction during the live video broadcast; and
adding the at least one avatar reaction to an ephemeral reaction stream associated with the live video broadcast.

2. The computer-implemented method of claim 1, wherein accessing the avatar associated with the social networking system user comprises:
identifying a social networking system profile associated with the social networking system user;

identifying the avatar associated with the social networking system profile; and
extracting a face of the avatar.

3. The computer-implemented method of claim 2, wherein modifying one or more features of the avatar based on the at least one emoticon reaction comprises:
determining a facial pose depicted by the at least one emoticon reaction; and
altering facial features of the face of the avatar to mirror the facial pose.

4. The computer-implemented method of claim 1, wherein the at least one emoticon reaction comprises at least one of: a like reaction, a love reaction, a hug reaction, a laugh reaction, a surprise reaction, a sad reaction, or an angry reaction.

5. The computer-implemented method of claim 1, wherein modifying one or more features the avatar based on the at least one emoticon reaction further comprises:
capturing an image of the social networking system user making a facial gesture mirroring the at least one emoticon reaction; and
modifying the one or more features of the avatar based on the captured image.

6. The computer-implemented method of claim 1, wherein generating the at least one avatar reaction is in response to a detected selection of an avatar reaction option associated with the live video broadcast.

7. The computer-implemented method of claim 1, further comprising converting the at least one avatar reaction back to a corresponding at least one emoticon reaction in response to a detected selection of an emoticon reaction option associated with the live video broadcast.

8. A system comprising:
at least one physical processor; and
physical memory comprising computer-executable instructions that, when executed by the at least one physical processor, cause the at least one physical processor to perform acts comprising:
generating, in connection with a social networking system user, at least one avatar reaction based on at least one emoticon reaction during a live video broadcast via a social networking system by:
accessing an avatar associated with the social networking system user, and
modifying one or more features of the avatar based on the at least one emoticon reaction;
detecting a selection of the at least one avatar reaction during the live video broadcast; and
adding the at least one avatar reaction to an ephemeral reaction stream associated with the live video broadcast.

9. The system of claim 8, wherein accessing the avatar associated with the social networking system user comprises:
identifying a social networking system profile associated with the social networking system user;
identifying the avatar associated with the social networking system profile; and
extracting a face of the avatar.

10. The system of claim 9, wherein modifying one or more features of the avatar based on the at least one emoticon reaction comprises:
determining a facial pose depicted by the at least one emoticon reaction; and
altering facial features of the face of the avatar to mirror the facial pose.

11. The system of claim 8, wherein the at least one emoticon reaction comprises at least one of: a like reaction, a love reaction, a hug reaction, a laugh reaction, a surprise reaction, a sad reaction, or an angry reaction.

12. The system of claim 8, wherein modifying one or more the avatar based on the at least one emoticon reaction further comprises:
capturing an image of the social networking system user making a facial gesture mirroring the at least one emoticon reaction; and
modifying the one or more features of the avatar based on the captured image.

13. The system of claim 8, wherein generating the at least one avatar reaction is in response to a detected selection of an avatar reaction option associated with the live video broadcast.

14. The system of claim 8, further comprising computer-executable instructions that, when executed by the at least one physical processor, cause the at least one physical processor to convert the at least one avatar reaction back to a corresponding at least one emoticon reaction in response to a detected selection of an emoticon reaction option associated with the live video broadcast.

15. A non-transitory computer-readable medium comprising one or more computer-executable instructions that, when executed by at least one processor of a computing device, cause the computing device to:
generate, in connection with a social networking system user, at least one avatar reaction based on at least one emoticon reaction during a live video broadcast via a social networking system by:
accessing an avatar associated with the social networking system user, and
modifying one or more features of the avatar based on the at least one emoticon reaction;
detect a selection of the at least one avatar reaction during the live video broadcast; and
add the at least one avatar reaction to an ephemeral reaction stream associated with the live video broadcast.

16. The non-transitory computer-readable medium of claim 15, further comprising computer-executable instructions that, when executed by the at least one processor of the computing device, cause the computing device to access the avatar associated with the social networking system user by:
identifying a social networking system profile associated with the social networking system user;
identifying the avatar associated with the social networking system profile; and
extracting a face of the avatar.

17. The non-transitory computer-readable medium of claim 16, further comprising computer-executable instructions that, when executed by the at least one processor of the computing device, cause the computing device to modify one or more features of the avatar based on the at least one emoticon reaction by:
determining a facial pose depicted by the at least one emoticon reaction; and
altering facial features of the face of the avatar to mirror the facial pose.

18. The non-transitory computer-readable medium of claim 15, further comprising computer-executable instructions that, when executed by the at least one processor of the computing device, cause the computing device to further modify one or more features of the avatar based on the at least one emoticon reaction by:

capturing an image of the social networking system user making a facial gesture mirroring the at least one emoticon reaction; and modifying the one or more features of the avatar based on the captured image.

19. The non-transitory computer-readable medium of claim 15, further comprising computer-executable instructions that, when executed by the at least one processor of the computing device, cause the computing device to generate the at least one avatar reaction in response to a detected selection of an avatar reaction option associated with the live video broadcast.

20. The non-transitory computer-readable medium of claim 15, further comprising computer-executable instructions that, when executed by the at least one processor of the computing device, cause the computing device to convert the at least one avatar reaction back to a corresponding at least one emoticon reaction in response to a detected selection of an emoticon reaction option associated with the live video broadcast.

* * * * *